United States Patent [19]

van de Werff et al.

[11] Patent Number: 5,728,779
[45] Date of Patent: Mar. 17, 1998

[54] POWDER PAINT OF EPOXY-REACTIVE POLYMER AND ALIPHATIC CHAIN-CONTAINING POLYEPOXIDE

[75] Inventors: Adrianus J. van de Werff, Zwolle; Leendert J. Molhoek, Nunspeet; Marten Houweling, Zwolle; Robert van den Berg Jeths, Apeldoorn; Dirk A. W. Stanssens, Lanaken; Robert van der Linde; Tosko A. Misev, both of Zwolle, all of Netherlands

[73] Assignee: DSM N.V., Heerlen, Netherlands

[21] Appl. No.: 464,207

[22] Filed: Jun. 5, 1995

Related U.S. Application Data

[60] Division of Ser. No. 151,304, Nov. 12, 1993, abandoned, which is a continuation-in-part of Ser. No. 59,329, May 11, 1993, abandoned.

[30] Foreign Application Priority Data

| Dec. 1, 1992 | [NL] | Netherlands | 9202080 |
| Apr. 16, 1993 | [NL] | Netherlands | 9300649 |
| Jul. 15, 1993 | [NL] | Netherlands | 9301239 |

[51] Int. Cl.$^6$ ............................ C08L 33/02; C08L 67/02
[52] U.S. Cl. .................... 525/438; 525/113; 525/117; 525/118; 525/119; 525/121; 525/122; 525/396; 525/423; 525/438; 525/481; 525/524
[58] Field of Search .................... 525/117, 118, 525/119, 438

[56] References Cited

U.S. PATENT DOCUMENTS

| 3,077,461 | 2/1963 | Hood et al. ............................ 260/30.4 |
| 3,102,823 | 9/1963 | Manasia et al. ........................ 117/21 |
| 3,218,274 | 11/1965 | Boller et al. ........................... 260/22 |
| 3,278,469 | 10/1966 | Pascale .................................. 260/21 |
| 3,336,251 | 8/1967 | Manasia et al. ........................ 260/18 |
| 3,344,096 | 9/1967 | Manasia et al. ........................ 260/18 |
| 3,362,922 | 1/1968 | Manasia et al. ........................ 260/18 |
| 3,374,193 | 3/1968 | Tsatos et al. ........................... 260/18 |
| 3,468,704 | 9/1969 | Graves ................................... 117/161 |
| 3,493,414 | 2/1970 | Hastings ................................ 117/41 |
| 3,576,903 | 4/1971 | Groff ..................................... 260/824 |
| 3,650,997 | 3/1972 | Wiesfeld ................................ 260/21 |
| 3,752,870 | 8/1973 | Labana .................................. 260/836 |
| 3,758,334 | 9/1973 | Dehm .................................... 117/100 A |
| 3,758,633 | 9/1973 | Labana .................................. 260/836 |
| 3,787,340 | 1/1974 | Labana .................................. 260/23 A X |
| 3,940,453 | 2/1976 | Labana .................................. 260/836 |
| 3,943,082 | 3/1976 | Smith et al. ............................ 525/108 |
| 3,988,288 | 10/1976 | Yamauchi et al. ...................... 525/438 |
| 4,147,737 | 4/1979 | Sein ....................................... 525/438 |
| 4,255,553 | 3/1981 | Mizumura et al. ..................... 525/119 |
| 4,304,802 | 12/1981 | Mosse .................................... 428/35 |
| 4,463,140 | 7/1984 | Belder et al. ........................... 525/438 |
| 4,542,192 | 9/1985 | Kraft et al. ............................. 525/438 |
| 5,095,046 | 3/1992 | Tse ........................................ 525/119 |

FOREIGN PATENT DOCUMENTS

| 116852 | 8/1989 | European Pat. Off. . |
| 329027 | 8/1989 | European Pat. Off. . |
| 365428 | 4/1990 | European Pat. Off. . |
| 506617 | 9/1992 | European Pat. Off. . |
| 55099 | 4/1967 | Germany . |
| 3301729 | 7/1984 | Germany . |
| 4032855 | 4/1992 | Germany . |
| 49-32998 | 7/1972 | Japan . |
| 48-07943 | 8/1979 | Japan . |
| 1-229078 | 12/1989 | Japan . |
| 1165647 | 10/1969 | United Kingdom . |
| 1333361 | 10/1973 | United Kingdom . |
| 1515541 | 6/1978 | United Kingdom . |
| 2109798 | 8/1982 | United Kingdom . |
| 1165647 | 10/1989 | United Kingdom . |

OTHER PUBLICATIONS

Merck, Powder Paints, "Paint India", 47–52 (Feb. 1992).
Misev, "Powder Coatings, Chemistry and Technology", 44–54, 131–226, 284–303 (1991).
Newman, "Chemistry of Turpenes and Turpenoids", 18–19 (1972).
Surface Coatings, I: 20–38 (1983).
Journal of Coatings Technology, 64:61–64 (Dec. 1992).
Encyclopedia of Polymer Science and Engineering, I:644–79 (1985).
Advances in Polymer Science, 71:182–198 (1985).
Journal of American Oil Chemist' Society, 70:457–460 (May 1993).
Kapilow et al., Resins and Curing Agents for Thermosetting Powder Coatings, Journal of Coatings Technology, Jul. 1987, pages 39–47, vol. 59, No. 750.

*Primary Examiner*—Robert E. Sellers
*Attorney, Agent, or Firm*—Cushman Darby & Cushman Intellectual Property Group of Pillsbury Madison & Sutro, LLP

[57] ABSTRACT

A binder composition for thermosetting powder paints comprising (i) a polymer that is capable of reacting with epoxy groups and (ii) a crosslinker that contains epoxy groups, wherein the crosslinker comprises at least one $C_5$ to $C_{26}$ linear or branched aliphatic chain with the proviso that epoxy groups are carried on at least one aliphatic chain. In order to function as a crosslinker the amount of oxirane-oxygen originating from the crosslinker in the binder composition is higher than 0.1 meq/gram. The crosslinker is, for example, an epoxydized oil, a modified epoxydized oil or an epoxydized alkyd resin. A powder paint comprising the binder composition can contain a suitable catalyst and, optionally, an additional curing agent.

16 Claims, No Drawings

5,728,779

POWDER PAINT OF EPOXY-REACTIVE POLYMER AND ALIPHATIC CHAIN-CONTAINING POLYEPOXIDE

RELATED APPLICATIONS

This is a division of application Ser. No. 08/151,304, filed Nov. 12, 1993 which is a CIP of application Ser. No. 08/059,329 filed May 11, 1993, both abandoned.

BACKGROUND OF THE INVENTION

1. Field of the Invention

The invention relates to a binder composition for thermosetting powder paints which comprises a polymer that is capable of reacting with epoxy groups and a crosslinker that contains epoxy groups, and to thermosetting powder paints comprising the binder composition.

2. Background Information

Thermosetting powder coatings have better hardness than thermoplastic powder coatings. As one consequence, historically there has been an intense effort to develop crosslinkers and polymers for thermosetting powder coating applications. This effort continues unabated. Indeed, polymers reactable with crosslinkers are still being sought to make binder compositions for thermosetting powder paints that have good flow, good storage stability and good reactivity as is evident from Merck, Powder Paints, Paintindia 47-52 (February 1992). The search is further complicated because the coating ultimately obtained from the powder paint must meet many and varying requirements, depending on the application. Various prior systems are known. Some systems release volatile components during curing. These systems suffer the drawbacks of forming coatings having blisters and/or of releasing undesirable emissions. In the latter regard, the volatile component, being of organic origin, can cause undesirable environmental or health concerns. In addition, it is found that not all desirable powder paint or coating properties are achieved. Other systems use polyesters and conventional crosslinkers containing an epoxy group. In general, in these systems no volatile components are released. However, the use of bisphenol-A epoxy resins in the so-called hybrid systems results in coatings that yellow and chalk relatively strongly on UV exposure, whereas the widely used triglycidyl isocyanurate (TGIC) crosslinker is toxicologically suspect.

SUMMARY OF THE INVENTION

The present binder composition for thermosetting powder paints comprises (i) a polymer which has functional groups capable of reacting with epoxy groups, and (ii) a crosslinker which comprises at least one $C_5$ to $C_{26}$ branched or linear aliphatic chain carrying epoxy groups. The crosslinker can comprise a plurality of $C_5$ to $C_{26}$ aliphatic chains. The crosslinker has an epoxy functionality greater than 1. In order to function as a crosslinker the amount of oxirane oxygen originating from the crosslinker in the binder composition is greater than 0.1 meq/gram. The crosslinker is suitable for use with many polymer systems.

The present composition is based on a crosslinker that is not toxic, nor mutagenic. The powder paints comprising the binder composition according to the present invention have good storage stability and good reactivity. Coatings obtained from these powder paints have a combination of very desirable properties.

DETAILED DESCRIPTION OF THE INVENTION

The present binder composition comprises a polymer capable of reacting with epoxy groups and an epoxy-functional crosslinker comprised of at least one $C_5$ to $C_{26}$ aliphatic branched or straight chain which carries epoxy functionality. The crosslinker can be comprised of a plurality of such aliphatic chains linked by ester, amide, urethane, or ether groups. However, in the latter instance, every aliphatic chain need not contain an epoxy group.

The amount of oxirane oxygen originating from the crosslinker in the binder composition is greater than 0.1 meq/gram of the composition. Preferably, this amount is greater than 0.15 meq/gram, more preferably greater than 0.25 meq/gram. Generally, the amount will be less than 1.3 meq/gram of the binder composition, preferably less than 1.0 meq/gram.

The binder composition contains between about 1.5 wt. % and about 30 wt. % of $C_5$–$C_{26}$ aliphatic chains, branched or linear, carrying an epoxy group. The composition preferably contains less than 20 wt. % aliphatic chains carrying an epoxy group. It is preferred for the composition to contain more than 2 wt. % aliphatic chains carrying an epoxy group, in particular more than 3 wt. %.

The binder composition generally contains more than 50 wt. % polymer and less than 50 wt. % crosslinker. Generally, more than 2 wt. % crosslinker is used. Preferably more than 3 wt. % relative to the binder composition, of crosslinker is used, although more preferably greater than 5 wt. % is used. It is preferred, however, to use less than 30 wt. % of crosslinker. The wt. % is with respect to the amount of polymer and crosslinker.

The binder composition itself is solid at room temperature and has a Tg (glass transition temperature) greater than 10° C. The Tg of the binder composition is generally greater than 30° C., although it is preferably greater than 40° C. to insure good storage stability under virtually all conditions. If the Tg is lower than about 20° C. to 30° C., the binder or any powder paint obtained therefrom can be stored under cooled conditions. The Tg is usually measured by means of a DSC (differential scanning calorimetry) apparatus with a temperature rise of 5° C./min.

The Tg of the binder system as a whole is affected by the crosslinker, by the Tg of the polymer, and by the amount of crosslinker that is mixed with the polymer. The Tg of the polymer can be selected based on the desired Tg of the final system. In addition, the amount of crosslinker depends on the quantity of reactive groups per weight unit of polymer. This means that the Tg of the polymer must increase with the quantity of reactive groups of an amount of polymer. Consequently, a relatively small quantity of reactive groups is, in general, a desirable objective.

Powder paints can be obtained that comprise the binder composition of the present invention, and suitable pigments, catalysts and additives. These powder paints and coatings therefrom have a surprisingly good combination of highly prized properties. Depending on the choice and the amount of polymer, crosslinker, catalyst and other components one can obtain, for example good flow, good chemical resistance, high gloss, high scratch resistance, good mechanical properties, good outdoor durability and good colour stability.

It is unexpected that epoxidized oils—which in themselves were known before the development of powder paints—can be used as a crosslinker to prepare thermosetting powder paints having desirable properties.

The Polymer Reactable with Epoxy Groups

A diverse number of polymers reactable with epoxy groups can be used in the present invention. Exemplary polymers reactable with epoxy groups are characterized in general terms by the reactive functional groups involved. Suitable polymers include, for example, a polymer with a reactive functionality selected from among carboxyl groups, epoxy groups, anhydride groups, hydroxyl groups, acetoacetonate groups, phosphoric acid groups, phosphorous acid groups, thiol groups and combinations thereof. The polymer preferably is substantially non-amino functional, at least substantially amino-free, because alkyl-amino groups cause coatings with bad colour stability. In general, this means that the polymer contains less than 0.2 wt. %, preferably less than 0.1 wt. % of amino compounds as functional groups.

The polymer can, for example, be a polyester, a polyacrylate, a polyether (such as, for example, a bisphenol-based polyether or a phenol-aldehyde novolak), a polyurethane, a polycarbonate, a trifluoro ethylene copolymer or a pentafluoro propylene copolymer, a polybutadiene, a polystyrene or a styrene-maleic anhydride copolymer.

The molecular weight (Mn) of the polymer is usually greater than 800, but is preferably greater than 1500. The polymer must flow well at temperatures between 100° C. and 200° C. and therefore has a molecular weight (Mn) below about 10,000, and preferably below about 7,000.

The polymer generally has a viscosity measured at 158° C. lower than 8000 dPas. The viscosity will usually be greater than 100 dPas. The viscosity can advantageously range from about 300 to about 5,000 dPas. As used herein, the viscosity was measured by the Emila method which is described in Misev, Powder Coatings; Chemistry and Technology, 287–288 (1991) (hereinafter "Misev, pp."). The temperature (158° C.) is the temperature actually measured in the sample.

The Tg of the polymer is typically greater than about 20° C., and can be greater than 40° C., although, in particular, it is preferably greater than 60° C. The Tg of the polymer is usually lower than 120° C., otherwise preparation of the binder composition can become somewhat difficult. The Tg of the polymer can, as indicated hereinabove, be selected based on the target Tg for the binder composition.

If polymers are used that have only terminal groups reactive with an epoxy functionality, the polymer has an average functionality (reactable with epoxy groups) of greater than about 1.6 and preferably greater than 2. The polymer in general has an average functionality less than 5, preferably less than about 3. If polymers are used with pendant functional groups, such as polyacrylates the average functionality will be greater than about 1.6, and preferably greater than 2. Such a polymer in general has an average functionality less than 8, preferably less than 4.

The polymer contains functional groups that are reactable with epoxy groups. Such a polymer typically has a quantity of functional groups below about 2.7 meq/gram of resin (polymer). The quantity preferably is lower than 1.25 meq/gram of resin, and, in particular, it is preferably lower than about 0.90 meq/gram. The quantity of functional groups is generally greater than about 0.09 meq/gram polymer, but preferably greater than 0.18 meq/gram polymer.

The acid or hydroxyl number of polymers with respectively acid or hydroxyl functional groups can be calculated by multiplying the quantity given in meq/g by 56.1 (the molecular weight of KOH). Hence, a polymer with carboxyl reactive groups typically has an acid number below 150 mg KOH/gram of resin (polymer). The acid number preferably will be lower than 70 and, in particular is lower than 50. The acid number is generally greater than 5, but preferably greater than 10.

The equivalent ratio between the reactive groups in the polymer to epoxy groups (e.g. carboxyl groups in the polymer and epoxy groups in crosslinker) is usually between 1.6:1 and 0.5:1, and is preferably between 1:1 and 0.8:1. This ratio may be lower if the epoxy-functional crosslinker according to the invention is used in combination with other crosslinkers.

Illustrative of the just described polymers capable of reacting with epoxy groups are polyacrylates, polyurethanes, polyethers and polyesters. As a matter of course, these polymers, which are described in more detail below, also exhibit the characteristics generally described hereinabove with respect to the polymer reactable with epoxy groups. Among the suitable polymers, polyesters, bisphenol based polyethers and polyacrylates are particularly preferred.

With the described polymers, various properties can be obtained in the binder and in the powder coating itself. Polyacrylates exhibit very good resistance to yellowing and to weather effects. Polyurethanes are usually wear resistant. Bisphenol based polyethers have good mechanical properties and very good corrosion resistance, while polyesters appear to have very good mechanical properties and do not yellow if the raw materials are suitably selected.

Polyacrylates

Polyacrylates useful herein as the polymer reactable with epoxy groups can be based on (meth)acrylic acid, methyl (meth)acrylate, ethyl (meth)acrylate, butyl (meth)acrylate, propyl (meth)acrylate, 2-ethylhexyl (meth)acrylate, cyclohexyl (meth)acrylate, decyl (meth)acrylate, isodecyl (meth) acrylate, benzyl (meth)acrylate and hydroxyalkyl (meth) acrylates such as hydroxyethyl (meth)acrylate and hydroxypropyl (meth)acrylate and/or glycidyl esters or glycidyl ethers of alkyl (meth)acrylates. By preference, the polyacrylates are substantially vinyl chloride-free. The polyacrylates can be obtained by known methods. In these methods, comonomers such as, for example, styrene, maleic acid/anhydride, as well as small amounts of ethylene, propylene and acrylonitrile, can be used. Other vinyl or alkyl monomers, such as, for example, octene, triallyl isocyanurate and diallyl phthalate can be added in small amounts.

A polyacrylate containing epoxy groups is obtained by using glycidyl (meth)acrylates in the synthesis of the polyacrylate.

A polyacrylate containing acid groups is usually obtained by copolymerization of the desired amount of acid, such as, for example, (meth)acrylic acid, maleic acid or fumaric acid.

A polyacrylate containing hydroxyl groups is obtained by copolymerization of the desired amount of monomers containing hydroxyl groups, such as, for example, hydroxyethyl (meth)acrylate and/or hydroxypropyl (meth)acrylate.

A polyacrylate containing thiol groups can be obtained by copolymerization of a sufficient amount of a monomer containing a thiol-group. By preference the thiol-group is protected, i.e. blocked. Monomers containing a (blocked) thiol group include S-acetyl esters of thiol-ethyl (meth) acrylate, thio-propyl(meth) acrylate, and combinations thereof. After polymerization, the blocking group, such as an acetyl group, can be deblocked, such as by hydrolysis.

A polyacrylate containing acetylacetonate groups can be obtained by copolymerizing the acetoacetonate ester of 2-hydroxy ethylacrylate.

The Tg of the polyacrylate is generally between about 30° C. and about 120° C. Relatively greater amounts of crosslinker can be used in the binder composition when the Tg is at the higher end of the range. For optimum storage stability the Tg is preferably higher than 50° C. For polymer processing reasons the Tg is preferably lower than 100° C.

In general, the viscosity of the polyacrylate is between 100 and 8000 dPas (measured at 158° C.; Emila).

Polyacrylates, such as epoxy, carboxy and hydroxy functional polyacrylates, are described in U.S. Pat. No. 3,752,870, U.S. Pat. No. 3,787,340, U.S. Pat. No. 3,758,334, and G.B. Patent Specification 1,333,361, the disclosures of which are incorporated herein by reference.

A thermoset and cured powder coating according to the present invention in which a polyacrylate served as the polymer reactable with epoxy groups has a sufficient surface hardness. Substantial amounts of vinyl chloride are therefore undesired.

Polyurethanes

Polyurethanes useful as the polymer reactable with epoxy groups include those having a terminal acid group. These polyurethanes can be obtained by a number of methods. One method comprises allowing an isocyanate-terminated polyurethane to react with a hydroxy carboxylic acid such as, for example, hydroxy acetic acid, lactic acid, malic acid or hydroxy pivalic acid. Another method comprises allowing a hydroxy-terminated polyurethane to react with a dicarboxylic acid or an anhydride. Still another method comprises allowing an isocyanate-terminated polyurethane to react with amino acids such as, for example, $\epsilon$-amino caproic acid.

In an analogous manner, urethanes that contain other functional groups can be obtained. Urethanes that contain epoxy groups can be obtained by allowing glycidol to react with a polyurethane containing isocyanate groups. Polyurethanes are described, for example, in JP-A-74/32998 and in Misev, pp. 160–161, the disclosures of which are incorporated herein by reference.

Polyethers

Polyethers useful as the polymer reactable with epoxy groups can be based on cyclic compounds such as, for example, bisphenol. Examples of bisphenol based resins are resins containing bisphenol-A, hydrogenated bisphenol-A, bisphenol-S and bisphenyl. Polyethers containing epoxy functionality are usually bisphenol-A-based epoxy resins such as, for example, Epikote® resins with a Tg higher than 10° C. Epikote® 1003, 1004 and 1007, for example, are quite suitable. Bisphenol-terminated epoxy resins are an example of polyethers containing an hydroxyl group.

Other suitable polymers containing a hydroxyl group include phenol-formaldehyde novolak. Strong Lewis acids are suitable as a catalyst for the reaction of epoxy groups with aliphatic hydroxyl groups. Epoxy polymers are described further in U.S. Pat. No. 3,362,922, and in Misev, pp. 131–144, the disclosures of which is incorporated herein by reference.

Polyesters

Polyesters useful as the polymer reactable with epoxy groups are generally based on the residues of aliphatic polyalcohols and polycarboxylic acids.

The polycarboxylic acids generally are selected from the group consisting of aromatic and cycloaliphatic polycarboxylic acids because these acids tend to have a Tg increasing effect on the polyester. In particular two-basic acids are used. Examplary polycarboxylic acids are isophthalic acid, terephthalic acid, hexahydro terephthalic acid, 2,6-naphthalene dicarboxylic acid and 4,4-oxybisbenzoic acid and, in so far as available, their anhydrides, acid chlorides or lower alkyl esters such as e.g. the dimethylester of naphthalene dicarboxylic acid. Although not required, the carboxylic acid component usually comprises at least about 50 mol %, preferably at least about 70 mol %, isophthalic acid and/or terephthalic acid.

Other suitable aromatic cycloaliphatic and/or acyclic polycarboxylic acids useful herein include, for example, 3,6-dichloro phthalic acid, tetrachloro phthalic acid, tetrahydro phthalic acid, hexahydro terephthalic acid, hexachloro endomethylene tetrahydro phthalic acid, phthalic acid, azelaic acid, sebacic acid, decane dicarboxylic acid, adipic acid, succinic acid, trimellitic acid and maleic acid. These other carboxylic acids can be used in amounts of up to at most 50 mol % of the total amount of carboxylic acids. The anhydrides, acid chlorides or lower alkyl esters of these acids can also, if desired, be used.

Hydroxy carboxylic acids and/or optionally lactones can also be used, such as, for example, 12-hydroxy stearic acid, hydroxy pivalic acid and $\epsilon$-caprolactone. Monocarboxylic acids, such as, for example, benzoic acid, tert.-butyl benzoic acid, hexahydro benzoic acid and saturated aliphatic monocarboxylic acids, can, if desired, be used in minor amounts.

Useful polyalcohols, in particular diols, reactable with the carboxylic acids to obtain the polyester include aliphatic diols such as, for example, ethylene glycol, propane-1,2-diol, propane-1,3-diol, butane-1,2-diol, butane-1,4-diol, butane-1,3-diol, 2,2-dimethylpropanediol-1,3 (=neopentyl glycol), hexane-2,5-diol, hexane-1,6-diol, 2,2-bis-(4hydroxy-cyclohexyl)-propane (hydrogenated bisphenol-A), 1,4-dimethylolcyclohexane, diethylene glycol, dipropylene glycol and 2,2-bis[4-(2-hydroxy ethoxy)-phenyl] propane, the hydroxy pivalic ester of neopentyl glycol. Small amounts, such as less than about 4 wt. % but preferably less than 2 wt. %, of trifunctional alcohols or acids can be used in order to obtain branched polyesters. Examples of useful polyols and polyacids include glycerol, hexanetriol, trimethylol ethane, trimethylol propane, tris-(2-hydroxyethyl)-isocyanurate and trimellitic acid.

Tetrafunctional monomers generally are not preferred, because these monomers may cause too much branching and gelling, although minute quantities can be used. Examples of useful polyfunctional alcohols and acids are norbitol, pentaerithritol and pyromellitic acid. In order to synthesise branched polyesters, trifunctional monomers are preferred.

Coating properties can e.g. be influenced by diol selection. For instance, if good weather resistance is desired, the alcohol component preferably contains at least 70 mol % neopentyl glycol, 1,4-dimethylolhexane and/or hydrogenated bisphenol-A. Caprolactone and hydroxypivalic acid are also useful if good weather resistance is desired.

It is also possible to copolymerize compounds carrying amine groups, such as, for example, hexane-1,6-diamine, butane-1,4-diamine and $\epsilon$-caprolactam. The amine group containing compound can replace at least part of the hydroxy group containing compound. The polyester having amide groups which is obtained generally exhibits an increased Tg, and the powder coating compositions obtained therefrom can have improved tribo-charging properties. These type of polyesters contain amide linkages and are not amino functional.

Compounds that are suitable for reaction with polycarboxylic acids to yield the desired polyesters are also monoepoxides such as, for example, ethylene oxide, propylene oxide, monocarboxylic acid glycidyl ester (for example Cardura E10™; Shell) or phenyl glycidyl ether.

The polyester preferably contains 5 wt. % to 30 wt. % of aliphatic acids and/or $C_6$–$C_{18}$ aliphatic alcohols. Examples of these compounds include adipic acid, cyclohexane dicarboxylic acid, succinic acid, cyclohexane dimethanol and hydrogenated bisphenol-A. These monomers can be used to improve the mechanical properties of the binder, a powder paint composition comprising the binder, or an powder coating prepared from the powder paint composition.

The polyesters are prepared according to conventional procedures by esterification or transesterification, optionally in the presence of customary esterification catalysts such as, for instance, dibutyltin oxide or tetrabutyl titanate. Preparation conditions and the COOH/OH ratio can be selected so as to obtain end products that have an acid number and/or a hydroxyl number within the targeted range of values.

A carboxylic acid functional polyester is preferably prepared in a series of steps. In the last step of which an aromatic or, preferably, aliphatic acid is esterified so as to obtain an acid-functional polyester. As known to those skilled in the art, in an initial step terephthalic acid is allowed to react in the presence of an excess of diol. Such reactions produce a mainly hydroxyl functional polyester. In a second or subsequent step, an acid functional polyester is obtained by allowing further acid to react with the product of the first step. A further acid includes, among others, isophthalic acid, adipic acid, succinic anhydride, 1,4-cyclohexane dicarboxylic acid, and trimellitic anhydride. If trimellitic anhydride is used at a temperature of 110°–200° C., a polyester with a relatively high number of trimellitic acid end groups is obtained.

The polyester can be a crystalline polyester, although amorphous polyesters are preferred. Mixtures of crystalline and amorphous polyesters can be used. Amorphous polyesters have a viscosity generally within a range of between 100 and 8000 dPas (measured at 158° C., Emila). Crystalline polyesters usually have a lower viscosity in the range of about 2 to about 200 dPas.

If the polyester contains carboxylic acid reactive groups, the acid number of the polyester is selected so that the desired amount of crosslinker can be used. The acid number preferably is higher than 10, and preferably higher than 15. The acid number is preferably less than 50 and, in a preferred embodiment, is less than 35.

Hydroxyl functional polyesters can be prepared in a manner known per se by the use of a sufficient excess of glycol (polyalcohol) in the polyester synthesis.

Epoxy functional polyesters can be prepared in a manner known per se such as, for example, by reacting an acid polyester with an equivalent of diglycidyl terephthalate or epichlorohydrin per acid group. Suitable polyesters of this type are described in U.S. Pat. No. 3,576,903, the disclosure of which is incorporated by references.

Phosphoric acid functional polyesters can be obtained by (trans)esterification of phosphoric acid (esters) with a hydroxy functional polyester. Another method for making phosphoric acid functional polyesters involves allowing $P_2O_5$ to react with a hydroxyl functional polyester. The polyester preferably is substantially non-amino functional.

Suitable polyesters for use in powder coatings described in, for example, U.S. Pat. No. 4,147,737 and U.S. Pat. No. 4,463,140, the disclosures of which are incorporated herein by reference.

The Tg of the polyester is selected to maintain the Tg of the polyester-crosslinker mixture high enough (preferably >30° C.) so that any powder paints or binders prepared therefrom are physically stable at room temperature. Polyester and crosslinker combinations with a lower Tg can, if desired, be employed in preparing a powder coating composition. However, to maintain powder stability such powders are kept under cooled conditions. The Tg of the polyester can be greater than 45° C., but preferably is greater than 60° C. The Tg is generally lower than 90° C.

The Crosslinker

The present epoxy-functional crosslinker comprises at least one $C_5$ to $C_{26}$ aliphatic chain provided that the epoxy functionality is carried on the aliphatic chain. The aliphatic chains can be linear or branched. The aliphatic chains carrying the epoxy functionality are preferably linear. The epoxy functional crosslinker can also comprise several aliphatic chains at least one of which carries epoxy functionality wherein the chains are linked via ester, amide, urethane or ether groups. As evident, it is not required that each chain carries an epoxy group. The epoxy functionality is, of course, greater than 1.

Preferably, the aliphatic chain contains 6 or more and in particular 12 or more carbon atoms. Preferably the aliphatic chain contains 22 or less carbon atoms.

The oxirane oxygen content of the crosslinker in general is higher than 1 wt. %, preferably higher than 2 wt. %. In general the oxirane oxygen content of the crosslinker will be lower than 20 wt. %, and in practice is mostly less than 15 wt. %.

The crosslinker preferably comprises an aliphatic ester carrying an epoxy group. When the crosslinker comprises aliphatic esters, the $C_5$ to $C_{26}$ aliphatic chains of the crosslinker are linked via ester groups. Exemplary esters include the methyl ester of linoleic acid, the tert.-butyl ester of linolenic acid, and epoxydized oil.

A crosslinker comprising aliphatic chains carrying an epoxy group can be obtained by epoxidation of unsaturated aliphatic compounds. Illustrative of the suitable unsaturated aliphatic compounds are ethylenically unsaturated acids, ethylenically unsaturated alcohols and ethylenically unsaturated amines. In general, ethylenic unsaturation is not present on the $\alpha,\beta$ position with respect to a heteroatom in the unsaturated aliphatic compound. It is further preferred, that the epoxy group is not present on the $\beta,\gamma$ position with respect to a hetero atom, in case the hetero atom is bound with the carbon atom via a double bond. It is further preferred that the ethylenic unsaturations are not mutually conjugated when the aliphatic chain has multiple unsaturations. In general, more than 2, preferably 3, saturated carbon atoms are present between the heteroatom and the unsaturation. Examples of suitable ethylenically unsaturated aliphatic compounds are 3-methyl-3-pentene-1-ol, 4-pentenoic acid, 3-pentenol, 5-hexenoic acid, 3-hexenol, 7-decenol, 6-dodecenoic acid or hydroxy terpenes. Hydroxy terpenes are described in Newman, Chemistry of Turpenes and Turpenoids, 18–19 (1972). Representative terpenes are, among others, acyclic hydroxy terpenes such as myrcene-8-ol, dihydrolinalol, myrcene-2-ol, linalol, nerol, geraniol, alpha-geranol, and alpha-nerol. Furthermore, unsaturated fatty acids and fatty alcohols are also suitable, and representative fatty acids comprise lauroleic acid, myristoleic acid, palmitoleic acid, oleic acid, linoleic acid, linolenic acid, ricinoleic acid, gadoleic acid, and erucic acid, as well as unsaturated fatty acids ($C_{20}$ and $C_{22}$ having multiple unsaturations) from herring or sardine oil. It being understood that fatty amine and fatty alcohol counterparts of fatty acids are contemplated, although an acid will be easier to obtain, and for this reason that class is preferred.

Preferably the epoxy group is not a terminal group. The epoxy groups in the crosslinker mainly comprise internal epoxy groups as shown in formula (I)

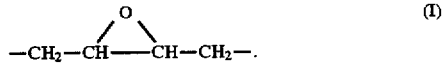

Although not required, the crosslinker usually contains more than one aliphatic chain, and can contain several chains, carrying an epoxy group. Unsaturated fatty acids with multiple unsaturations that are poly-epoxydized can for example also be used as alkyl ester, the alkyl being, for example, methyl, ethyl, propyl, cyclohexyl or 2-ethylhexyl.

In a first embodiment, the average functionality of the crosslinker is usually greater than 1.2, preferably greater than 1.7, in particular greater than 2.1. In general the average functionality is lower than 8.

Examples of suitable crosslinkers are epoxydized unsaturated oils of vegetable, animal or marine origin, or corresponding epoxydized unsaturated fatty acids that are wholly or partly esterified with polyalcohols. The crosslinkers can comprise, for example, an epoxydized oil, and/or natural oils that contain epoxy groups. In fatty chains of natural origin the ethylenic unsaturation is generally seven —CH$_2$— groups removed from a carbonyl group. The remaining double bonds of optionally partly epoxydized fatty acids can be removed by, for example, hydrogenation and/or further epoxidation.

A fatty chain means the aliphatic chain of an equivalent fatty acid, fatty alcohol or fatty amine.

Examples of suitable crosslinkers are epoxydized oils wherein the oil is linseed oil, soybean oil, safflower oil, oiticica oil, caraway seed oil, rapeseed oil, castor oil, dehydrated castor oil, cotton seed oil, wood oil, vernonia oil (a natural oil), sunflower oil, peanut oil, olive oil, soybean leaf oil, maize oil, fish oil such as, for example, herring or sardine oil, and non-cyclic terpene oils. The epoxydized oil is preferably epoxydized soybean oil and/or epoxydized linseed oil.

Vegetable oils and epoxidation thereof are described in Surface Coatings, Vol. I:20–38 (1983), the disclosure of which is incorporated herein by reference.

Epoxydized compounds include diesters, triesters and oligo-esters of polyalcohols such as glycerol, trimethylol propane, pentaerythritol, dipentaerythritol and unsaturated fatty acids. Tall oil fatty acid as well as the fatty acids of the above-mentioned unsaturated oils can be used as the fatty acid.

There may be advantage in using transesterified fatty acids consisting of fatty acids of said oils with a monoalcohol, if a crosslinking agent having a relatively low functionality is required. Monoalcohols are typified by ethanol, t-butanol, and hexanol.

A suitable crosslinker can also be comprised, for example, of alcohols that carry an epoxy group which have been esterified with carboxylic acids containing one or more carboxyl groups. Illustrative of such other suitable crosslinkers are the triester of trimellitic acid and 3,4-epoxy hexanol or of epoxydized unsaturated fatty alcohol. As unsaturated fatty alcohols, the alcohol equivalent to a fatty acid can be used.

Additional crosslinkers comprise epoxydized fatty borates. These crosslinkers can be obtained by allowing fatty alcohols to react with H$_3$BO$_3$ or BH$_3$, and then epoxidizing the reaction product in a conventional manner.

Still other suitable crosslinkers can be prepared by esterifying unsaturated fatty alcohols with phosphoric acid. This can be effected by allowing a fatty alcohol to react with P$_2$O$_5$. Another method involves a transesterification of the fatty alcohol with trimethyl phosphate. Aliphatic phosphite functional crosslinkers can be obtained in an analogous manner. For instance, aliphatic phosphite functional crosslinkers can be obtained by allowing phosphoric acid to react with a fatty alcohol. The unsaturations in the fatty chains can subsequently be epoxydized in a known manner. These crosslinkers containing phosphorus have a positive effect on the color of the coating. The positive effect includes reduction of, if not prevention of, discoloration during the curing reaction and/or with overbake.

Yet other suitable crosslinkers can be prepared, for example, by reacting fatty acids or fatty amines with polyglycidyl compounds such as, for example, triglycidyl isocyanurate, Epikote 1001® or diglycidyl terephthalate, and subsequently epoxidizing the ethylenically unsaturated bonds in the customary manner.

Further suitable crosslinkers can be obtained by transesterification of fatty alcohols with dimethyl carbonate, or by reaction of phosgene with fatty alcohols to obtain fatty carbonates. The fatty carbonates are then epoxydized in the customary manner.

Suitable crosslinkers also include, for example, thioesters of epoxydized fatty acids and polythiols.

Other examples of crosslinkers include fatty amides, fatty urethanes or fatty urea derivatives containing epoxy groups. These crosslinkers are advantageous because binder compositions incorporating them have a higher Tg than when comparable amounts of epoxydized oils are used. The presence of amide bonds enhances the Tg, and the higher Tg means improved storage stability.

Fatty amides can simply be prepared by reacting unsaturated fatty acids with di-, tri- or polyamines. Examples of suitable amines are 1,6-hexane diamine, 1,4-cyclohexane dimethyl amine, isophorondiamine, 1,4-diamino-butane, and 1,5-diamino-2-ethyl-amino pentane, among others. The unsaturated fatty amides can then be epoxydized in the customary manner. Another method for making suitable fatty amides comprises reacting fatty amines with polyacids such as, for example, terephthalic acid, isophthalic acid, trimellitic acid or 1,4-cyclo-hexane dicarboxylic acid. The unsaturated fatty amides are then subsequently epoxydized in the customary manner.

Yet another method of preparing epoxydized tafty amides involves direct amidation of epoxydized oils. This can be achieved by the reaction of polyamines with epoxydized oil as described in J. Am. Oil Chemists' Soc., 70 (no. 5):457–460 (1993), the disclosure of which is incorporated herein by reference.

Fatty urethanes can be prepared by reacting unsaturated fatty alcohols with di-, tri- or polyisocyanates and subsequently epoxidizing the unsaturated fatty chains.

Fatty urea compounds can be prepared by reacting unsaturated fatty amines with di-, tri- or polyisocyanates and subsequently epoxidizing the fatty chains. A number of polyisocyanates can be used. Among those, hexamethylene diisocyanate or its trimer, isophorone diisocyanate (IPDI) or its trimer, dicyclohexane methane diisocyanate and tetramethyl xylene diisocyanate (TMXDI) are quite suitable.

In a second embodiment, modified epoxydized oils or epoxydized alkyd resins can be used as a crosslinker.

According to this second embodiment the average functionality can be much higher than with the first embodiment. In the second embodiment the epoxy functionality is in general greater than 1.5, advantageously greater than 2.1, and preferably greater than 3, and can be higher than 5. The functionality is generally lower than 50, and is preferably lower than 40.

The oils can be modified with, for example, mono- and/or polyfunctional epoxy-reactive compounds. Examples of such epoxy-reactive compounds are compounds containing carboxylic acid groups, compounds containing anhydride groups, compounds containing amine groups, or bisphenols. These epoxy-reactive compounds are exemplified by phthalic acid, isophthalic acid, para-tertiary butyl benzoic acid, terephthalic acid, benzoic acid and adipic acid, phthalic anhydride, hexahydro phthalic anhydride, tetrahydro phthalic anhydride, succinic anhydride, combinations of such anhydrides, diamino butane and diamino hexane and bisphenol-A.

Another suitable modification involves the urethanization of an oil containing, for example, a hydroxyl group, such as castor oil, with mono- and diisocyanates, after which the oligomeric oil-urethanes are epoxydized in the customary manner.

Other suitable modified crosslinkers are, for example, epoxydized urethanized oils. These oils are prepared by reacting polyisocyanates with partially esterified polyols as described in *J. of Coatings Techn.*, 64(no. 815):61–64 (December 1992), the disclosure of which is incorporated herein by reference. Such oils can be epoxydized according to conventional methods.

In the second embodiment, further crosslinkers comprise epoxydized alkyd resins. Epoxydized alkyd resins can be obtained by transesterification of epoxydized oils with conventional components, such as polyols and polyalkyl esters. Alkyd resins are described in, for example, *Encyclopedia of Polymer Science and Engineering*, 1:644–679 (1985), the disclosure of which is incorporated herein by reference. It is also possible to epoxidize an alkyd resin containing unsaturated aliphatic chains (in general) with, for example, peracetic acid.

Suitable products are preferably obtained by one-stage or two-stage transesterification of epoxydized oils with mixtures of polyalcohols and di- or polyalkyl esters of di- or polycarboxylic acids. For example, first the methyl ester of 4-hexenoic acid can be epoxydized, after which the resulting epoxydized oil is transesterified with an equimolar amount of trimethylol propane, methanol being distilled off. Subsequently, the trimethylol propane ester of 4,5-epoxyhexanoic acid can be esterified further with dimethyl terephthalic acid, methanol being distilled off. The result is an epoxydized alkyd resin. In an analogous manner an epoxydized oil can be transesterified with, for example, pentaerythritol and simultaneously or subsequently with dimethyl adipate.

Mixtures of the crosslinkers described hereinabove can be used, and can be combined at pre-selected ratios. The pre-selected ratio will depend on the desired application.

In order to function as a crosslinker herein, the epoxy-functional crosslinker, as such, reacts during curing to at least a substantial extent. Generally, the reaction should be such that mechanical and/or chemical resistance properties of the cured coating are obtained through the curing reaction of the epoxy-functional crosslinker and the polymer reactable therewith. In this respect, and contrary to PVC powder systems, the present epoxy-functional crosslinkers, such as epoxydized oils, are not serving as a flexibilizer and stabilizer.

Depending on the desired end-use application, crosslinkers described hereinabove can also be used in combination with still other crosslinkers. Crosslinkers containing epoxy groups, such as, for example, triglycidyl isocyanurate (TGIC), polybisphenol-A-epoxides such as, for example, the various Epikote® types can be used in combination with crosslinkers described hereinabove. Another class of crosslinkers that can be used in such combinations are compounds containing (blocked) isocyanate groups, such as, for example, the caprolactam blocked isophorone diisocyanate trimer. A still further class of crosslinkers that can be used in such combinations are compounds that contain β-hydroxyalkyl amide groups, such as, for example, Primid XL 522™ (Rohm and Haas). Polyfunctional oxazolines can also be used in combination with the epoxy-functional crosslinkers based on at least one aliphatic chain having the epoxy functionality.

Thus, relative to the amount of other crosslinkers, the amount of the epoxy-functional crosslinker comprised of at least one aliphatic chain carrying epoxy functionality is preferably such that more than 20% of crosslinking is obtained through that crosslinker. More preferably, it is desired that more than 35% of crosslinking, and in particular more than 50% of crosslinking, be obtained using the heretofore described crosslinker comprising aliphatic chains.

Although the crosslinker according to the present invention can be used in combination with other crosslinkers, it is preferred to use this crosslinker as the main crosslinker, and more preferably as essentially the sole crosslinker.

Preparation of A Binder and A Powder Paint

The present invention relates to the binder composition, to a powder paint comprising the binder, and to a substrate, coated with the cured powder paint. A binder composition generally is defined as the resinous part of the powder paint.

The powder paint containing the binder composition according the invention preferably includes a small but effective amount of catalyst for the curing reaction between the polymer capable of reacting with epoxy groups and the crosslinker carrying epoxy groups on the aliphatic chain.

The binder composition of the present invention can, if desired, be supplied as a single component system. In a single component system a large part or all of the polymer and substantially all of the crosslinker comprising an epoxydized aliphatic chain are supplied as a mixture, which mixture is preferably homogeneous. Such a homogenous single component mixture is advantageous, since no significant amounts of liquid components need to be processed while making a powder paint composition from such a mixture.

A single component binder system can be obtained by mixing the crosslinker with the polymer at a temperature above 70° C. to form a homogenous mixture, followed by cooling, crushing and grinding the mixture to the desired particle size to obtain sufficiently chemically homogeneous powder particles. The crosslinker and polymer can be mixed in an extruder or a kneader.

Although the binder composition can be efficaciously prepared according to various methods, it is preferably obtained by mixing the polymer and the crosslinker in a static mixer at elevated temperature for a short period of time. Elevated temperatures can be above 150° C. and short periods of time can, for instance, be on the order of seconds, such as 20 seconds. The static mixer is preferred because low-viscosity materials, such as unmodified epoxydized oils, are facilely mixed with the polymer. The mixed product is thereafter cooled, crushed and ground to the desired particle size to obtain sufficiently chemically homogeneous powder particles.

As a general proposition, the grinding yields particle sizes on the order of 0.5 mm to about 15 mm. The particle sizes can fall in the range of 1 mm to 12 mm, and can average about 5 to 6 mm. Usually about 80 % of the particles are larger than 1 mm, although it will be appreciated that the size is not critical.

A powder paint composition can then be prepared by mixing the binder composition with a catalyst and, optionally, a pigment, customary fillers and other additives and optionally additional curing agents at a temperature above the melting point of the binder composition.

Instead of using the binder system as a single component, the various ingredients of the binder composition can also be mixed with the other ingredients of the powder paint during the preparation of the paint. In this embodiment the crosslinker—which is generally liquid at 20°–40° C.—can be added by means of a metering pump to an extruder as the polymer resin is being extruded. Mixing in general takes place above the melting paint (or range) of the polymer. The crosslinker can also be incorporated in pigment or filler and subsequently added to the resin (polymer capable of reacting with epoxy groups) and mixed such as in an extruder.

The catalyst and additives also can be added either to the polymer or to the crosslinker.

The catalyst and/or the curing agent can also be added by extrusion techniques during powder paint preparation, together with the pigments and the fillers.

The catalyst and additives can, if desired, be applied as a masterbatch. Such a masterbatch can be a mixture of the polymer resin which is capable of reacting with epoxy groups that is also used for the binder composition or another—not reactive—resin with the catalyst and optionally all or a part of the additives.

Subsequently, the various components can be mixed using an extruder or kneader at temperatures between, for example, about 70° C. and about 150° C. In general, the mixing is conducted at temperatures above the melting point or within or above the melting range of the binder. Depending on the temperature used and the catalyst used, it may be necessary to conduct the mixing and cooling rapidly. The average residence time in the mixing apparatus is preferably less than half of the gel time of the system at the mixing temperature.

In a preferred embodiment of the invention, a two-component (or two-package) system for the preparation of a powder paint comprises a first component consisting essentially of all or a large part of the polymer (i) and the crosslinker (ii) and a second component consisting essentially of a polymer (i) or another polymer and a catalyst for the curing reaction between the polymer (i) and the crosslinker (ii) (masterbatch).

In case the polymer of the masterbatch is not the same as the one in the first component, it may be either a polymer that will react with the crosslinker or a substantially not-reactive polymer. One or both of the components may comprise customary additives as described below, in particular stabilizers or additional curing agents. The first component as defined here is essentially the "single component" as defined above.

It is also attractive to use a mixture of a crystalline polyester with an amount of 20–50 wt. % of crosslinker as a first component. This type of master batch can be used in admixture with a further polymer that can constitute 30–70 wt. % of the binder composition. The further polymer may comprise the catalyst or the catalyst may be added separately.

If desired, the residence time during homogenization of a binder or powder paint composition can be selected such that there is some degree of reaction between the polymer and the crosslinker. A degree of pre-reaction between the polymer and crosslinker will shorten the reaction time needed to cure the powder paint composition and may increase the glass transition temperature of the powder paint.

The curing reaction between the polymer and the crosslinker to form the ultimate cured coating will generally occur in the presence of an effective amount of catalyst. In appropriate cases it is useful to apply an additional curing agent. With the binder composition according to the invention, the desired curing time can readily be selected by adjusting the amounts of and selection of the catalyst and/or curing agent. The importance of the heretofore described polymer-crosslinker ratio and of the amount of catalyst is elucidated in Misev pp. 174–223, the disclosure of which is incorporated herein by reference.

Powder paints typically have particle sizes smaller than about 90 to 100 microns, and generally have particle sizes averaging about 50 microns, although particle sizes on the order of 20 microns can be used.

The preparation of powder paints and the chemical curing reactions thereof to obtain cured coatings are generally described in, for example, Misev, pp. 44–54, p. 148, and pp. 225–226, the disclosure of which is incorporated herein by reference.

With a powder coating composition according to the invention it is possible to achieve a curing cycle of, for example, 150° C. at 10 minutes. If desired, 20 minutes curing at 200° C. is also possible. The amount of catalyst suitable for the reaction will be selected so that the desired curing and flow are obtained, such as, for example, in 20 to 30 minutes at 150° C., or in 10 to 15 minutes at 180° C., up to 5 to 10 minutes at 200° C.

Thus, the polymer capable of reacting with epoxy groups, the crosslinker, an amount of catalyst—if necessary—and an amount of additional curing agent—if any—will be selected so that the curing reaction is substantially complete within 30 min at 200° C.

Hence, the invention also relates to a process for preparing a wholly or partially coated substrate by applying the present powder coating to the substrate wherein (a) the polymer capable of reacting with epoxy groups (i), the crosslinker (ii), optionally an amount of catalyst and optionally an amount of additional curing agent are selected so that the curing reaction is substantially complete within 30 min at 200° C., (b) curing the coating by subjecting it to heat for a sufficient time at a suitable temperature to obtain a cured coating, and (c) the amount of epoxy functional crosslinker (ii) is such that more than 20% of the crosslinking is obtained through that crosslinker.

Catalysts and curing agents known to those skilled in the art for epoxy-acid, epoxy-epoxy, epoxy-hydroxy and epoxy-anhydride reactions can be used with powder coating (paint) compositions based on the present binder composition. These catalysts generally contain tertiary amine groups or other basic nucleophilic groups.

For the epoxy-acid reaction, the relevant catalysts listed in Madec et al., *Kinetics and Mechanisms of Polyesterifications*, Advances in Polymer Science, 182–198 (1985), the disclosure of which is incorporated herein by reference, can, in principle, be used.

It should be noted that the aliphatic type of epoxy groups in the crosslinker according the invention is one of the least reactive type of epoxy groups. Therefore, a sufficient amount of catalyst is important to obtain a fast curing powder paint.

Examples of suitable classes of catalysts are N-dialkylamine pyridines, tertiary amines, imidazole derivatives, guanidines and cyclic amine compounds. If desired, the catalysts may be blocked. Specific examples of catalysts include N-dimethylamino pyridine, benzotriazole, triethylamine or triphenylamine, 4,5-diphenyl imidazole, 1-ethyl imidazole, 2-methyl imidazole, 4-methyl imidazole, ethyl imidazole carboxylate, 5,6-dimethyl benzimidazole, 1-benzyl imidazole, imidazole or 1,1-carbonyl diimidazole, tetramethyl guanidine (TMG), isocyanate-TMG adducts (e.g., isophorone diisocyanate-di-tetramethyl guanidine, tolonate-HDT-tetramethyl guanidine, or TMXDIdiTMG), acetyl-TMG, 2-phenyl-1,1,3,3-tetramethyl guanidine, 1,5-diazabicyclo[4,3,0]non-5-ene and 1,5,7-triazabicyclo[4,4,0]dec-5-ene. Other catalysts include tetraalkyl phosphonium bromide, tetrabutyl ammonium fluoride, cetyl triethyl ammonium bromide, benzothiazole and lithium derivatives. Suitable lithium derivatives include lithium alkanolates, such as, for instance, lithium butanolate, lithium triazole, lithium imidazole and lithium hydroxide.

By preference, the catalyst is tetramethyl guanidine or a derivative thereof, an imidazole derivative such as 1-benzyl imidazole or 4,5-diphenyl-imidazole, a lithium derivative, or a combination thereof because the coatings have good color properties and good resistance to overbake.

For epoxy-anhydride reactions no catalyst is generally required. Nonetheless, it may still be advantageous to use a nitrogen-containing catalyst, which catalyst is as described above.

For epoxy-hydroxy reactions a strong Lewis acid can be used as the catalyst. Even so, an additional curing agent, such as, for example, a polyanhydride can be used. Anhydrides, such as trimellitic anhydride adducts, or styrene-maleic anhydride copolymers are quite suitable for that purpose. Powder paints comprising a binder consisting of, for instance, an hydroxyl polyester, epoxidized oil and polyanhydride curing agent can simply be made by using a mixture of polyester and epoxidized oil as a single component. The anhydride curing agent can be added while making the powder paint.

For epoxy-epoxy reactions a strong Lewis acid can be used as a catalyst, although an additional curing agent is usually required. Known curing agents can be used as the additional curing agent. Known curing agents include, for example, the polyanhydrides, dicyano diamides, dicarboxylic acid, hydrazides and polyphenols. By preference, substituted dicyandiamides, substituted amines (such as, for example, methylene dianiline, 2-phenyl-2-imidazoline ester of pyromellitic or of trimellitic acid), polyphenols and anhydrides (preferably resinous anhydrides such as, for example, ethylene glycol bistrimellitate) are used.

The amount of catalyst is usually between 0.05 and 2 wt. %, but preferably is between 0.1 and 1.5 wt. %. The weight percents are with respect to the binder composition.

The amount of additional curing agent, if used, is in general between 1–15 wt. % with respect to the binder, and preferably is between 3 and 10 wt. %.

Of course all customary additives can, if desired, be used in the powder coating systems according to the invention, such as, for example, pigments, fillers, deaerating agents, flow-promoting agents and stabilizers. Pigments include inorganic pigments, such as titanium dioxide, zinc sulphide, iron oxide and chromium oxide, as well as organic pigments such as azo compounds. Fillers comprise metal oxides, silicates, carbonates and sulphates.

As additives, stabilizers such as primary and/or secondary antioxidants and UV stabilizers such as, for example, quinones, (sterically hindered) phenolic compounds, phosphonites, phosphites, thioethers and HALS compounds (Hindered Amine Light Stabilizers) can be used. In order to obtain powder coatings that have good stability during cure, the primary antioxidants appear important. Therefore, the powder paint preferably includes an effective amount of stabilizer, which in general is an amount of 0.1–2 wt. % with respect to the binder composition. Stabilizers are well known, and several of the useful ones are shown in the examples.

Deaerating agents are exemplified by benzoin or cyclohexane dimethanol bisbenzoate. Flow-promoting agents include, among others, polyalkyl acrylates, fluorohydrocarbons and silicon oils. Other additives include those which are used to improve tribo charging, such as, for example, sterically hindered tertiary amines.

Powder paints according to the invention can be applied in the customary manner, for example by electrostatic spraying of the powder onto an earthed substrate, and curing the coating by subjecting it to heat for a sufficient time at a suitable temperature. The applied powder can be heated in, for example, a gas furnace, an electric furnace or by means of infrared radiation.

A powder coating comprised of a polyester and the aliphatic chain-based crosslinker (a binder embodiment according to this invention) generally has better resistance against yellowing than a comparable coating in which the crosslinker is a bisphenol-A epoxy resin. In so far as known, epoxydized oils are not suspect toxicologically.

Industrial thermosetting coatings from powder paint (coating) compositions are further generally described in Misev, pp. 141–173.

Compositions according to the present invention can be used in powder coatings for use on metal, wood and plastic substrates. Examples are general-purpose industrial coatings, coatings for machinery and also, for instance, for cans, domestic and other small equipment. Furthermore, the coatings are quite suitable in the automotive industry, to coat exterior and/or interior parts of vehicles such as cars.

The invention will be further described based on the following non-limiting examples.

EXAMPLES

The examples show that epoxydized oils or modified epoxydized oils are excellent crosslinkers in binder compositions for powder paints. As will be seen from the Examples, various polymers capable of reacting with epoxy groups have been used, including polyesters with acid groups, a polyacrylate with acid groups, a bisphenol-A-based polyether with epoxy groups, a polyester with hydroxyl groups, and a polyester with phosphoric acid groups. The crosslinker was also combined with polyisocyanates, TGIC and a bisphenol-A epoxy resin, useful compositions were obtained. The examples show that an epoxy-functional crosslinker comprised of at least one epoxydized aliphatic chain can be used with specially polymers as well as with customary polymers for powder paints.

Unless stated otherwise, in the examples the preparation of the powder paints comprising the binders involved cooling an extruded binder with pigments, crushing the cooled product, and grinding the crushed product to obtain powder particles capable of being electrostatically applied to an earthed metal substrate. Unless indicated otherwise, use was made of a steel Q panel S 46 which was browned on one side. The dimensions were 0.8×102×152 mm.

In the Tables, unless indicated otherwise, the times are in minutes ('). Most of the tests are described in Misev, pp. 284–303.

Preparation of polyester resin 1

A reactor vessel (3 liters), equipped with a thermometer, a stirrer and a distillation set-up, was charged with 1.39 parts by weight of trimethylol propane, 55.3 parts by weight of terephthalic acid, 37.0 parts by weight of neopentyl glycol, 0.05 wt. % dibutyltin oxide and 0.05 wt. % tris-nonyl phenyl phosphite.

While the reaction mixture was being stirred and a light nitrogen flow was passed over it, the temperature was then raised to 170° C., and water was formed. The temperature was gradually raised further to a maximum of 245° C. and the water was distilled off. The reaction was continued until the acid number of the polyester was lower than 12 mg KOH/g.

17

Subsequently, in a second step, isophthalic acid (6.31 parts by weight) was added to the reaction vessel and further esterification took place and a polymer ("polyester resin no. 1") having an acid number of 25.7 was obtained. The last part of the second step of the process was carried out under reduced pressure.

The characteristics of the resulting resin were:

acid number: 26 mg KOH/g;
functionality: 2.75;
viscosity: 1800 dPas (Emila 158° C.);
Tg: 71° C.

The theoretical —COOH functionality is given, based on the amount of trifunctional monomer and the theoretical molecular weight.

Preparation of polyester resin 2

The above procedure was repeated, except that 1.43 parts by weight of trimethylol propane, 53.04 parts by weight of terephthalic acid, 36.71 parts by weight of neopentyl glycol and 8.83 parts by weight of isophthalic acid were used. The characteristics of the resulting resin were:

acid number: 24 mg KOH/g;
functionality: 3.0;
viscosity: 3700 dPas (Emila 158° C.);
Tg: 73° C.

Preparation of polyester resin 3

The above procedure was repeated, except that 1.95 parts by weight of trimethylol propane, 55.15 parts by weight of terephthalic acid, 36.61 parts by weight of neopentyl glycol and 6.29 parts by weight of isophthalic acid were used.

The characteristics of the resulting resin were:

acid number: 23 mg KOH/g;
functionality: 3.25;
viscosity: 6400 dPas;
Tg: 73° C.

Preparation of polyacrylate resin 1

Toluene (31.59 parts by weight) was charged to a reaction vessel equipped with a thermometer, stirrer, inert gas inlet and reflux condenser.

In 3 hours a mixture of 52.12 parts by weight of methyl methacrylate, 7.83 parts by weight of butyl acrylate, 3.22 parts by weight of acrylic acid and 5.05 parts by weight of Luperox 575® was added to 31.59 parts by weight of toluene under reflux.

After addition of the monomer mixture the reaction mixture was stirred for 2 hours, after which 0.19 parts of Luperox 575® were added.

Stirring was then continued for another two hours and subsequently the volatile components were removed by vacuum distillation. The maximum temperature was 160° C.

The molten resin was poured out and cooled. The properties of the resulting resin were as follows:

acid number: 39 mg KOH/g;
viscosity: 405 dPas;
Tg: 58° C.

Preparation of crosslinker 1

1500 parts by weight of a mixture of distilled oleic acids, 250 parts by weight of trimethylol propane and 200 parts by weight of xylene were placed in a reactor vessel (3 liters) equipped with stirrer, inert gas feed, thermometer and reflux condenser with an azeotropic water separator.

Water was removed as the temperature was gradually raised to 240° C. under reflux conditions.

As soon as the acid number had fallen below 10 mg KOH/g, 0.1 part by weight of DBTO (dibutyltin oxide) was added.

18

At an acid number ≦5 vacuum distillation was applied until xylene had been removed.

The result was a light-brown, low-viscosity liquid with an acid number ≦5.

The resulting oil was epoxydized in the following manner. A solution of sodium acetate (10.0 grams) in peracetic acid solution (107 grams of 32% solution) was added dropwise to a solution of TMP trioleate (100.0 grams; 0.109 mol) in CHCl₃ (100 grams). The temperature was kept between 45° and 50° C. by cooling slightly. After the addition, the mixture was stirred for 5 hours at a temperature of approximately 45°–50° C. After cooling, CHCl₃ was evaporated and the epoxydized oil was mixed with toluene. After washing with a 5% NaHCO3 solution and water, the organic layer was dried with magnesium sulphate. After evaporation in a rotary evaporator (approximately 5 mbar, 40° C.), a practically colorless end product was obtained.

The product obtained had an epoxy equivalent weight (e.e.w.) of 372 grams, an epoxy functionality of 2.7, and a percentage of oxirane-oxygen (% O) of 4.3%.

Example I

Preparation of powder paint

At 120° C. polyester resin 1 (181.7 parts by weight) was fed to a kneader (IKA-Hochleistungs-laborkneter HKD-T0.6). After the resin had melted completely, titanium dioxide white pigment (100 parts by weight; KRONOS 2160™) was dispersed in the resin.

Subsequently 3 parts by weight of flow-promoting agent (Resiflow PV 5™; Worlée), 1.5 parts by weight of benzoin ("degassing" or "deaerating" agent) and 1 part by weight of stabilizer (Irganox 1010; Ciba Geigy) were added and incorporated in the resin.

Then 18.3 parts by weight of epoxydized linseed oil (hereafter sometimes called "ELO") with a functionality of between 6–8 (Lankroflex®: Harcross Chemicals; e.e.w.= 180; % O=8.9) were added, and subsequently 1 part by weight of tetramethyl guanidine (TMG; Janssen Chimica).

The resulting product was cooled, reduced in size, pulverized and screened to a maximum particle size of 90 μm.

The powder paint (coating) composition was applied electrostatically to an earthed metal substrate and the applied coating was cured for 10 minutes at 200° C.

Example II

Preparation of powder paint

Example I was repeated, except that 176.5 parts by weight (in place of 181.7 parts by weight) of polyester resin 1 and 23.5 parts by weight of epoxydized soybean oil (hereafter sometimes referred to as "ESO") with a functionality of 4–5 (Edenol D 82®; Henkel; e.e.w.=240; % O=6.7) (in place of epoxydized linseed oil).

The characteristics of the powder coatings obtained from the powder paints of Examples I and II are summarized in Table 1.

TABLE 1

|  | Example | |
| --- | --- | --- |
|  | I | II |
| impact resistance[1] | 160 ip | 160 ip |
| ESP[2] | >8 | >8 |
| adhesion[3] | Gto | Gto |

TABLE 1-continued

| | Example | |
|---|---|---|
| | I | II |
| gel time, 200° C.[4] | 35 s | 63 s |
| Tg | 47° C. | 37° C. |
| acetone resistance[5] | >100 | >100 |
| gloss, 20°[6] | 61 | 67 |
| 60° | 89 | 85 |
| overbake test[7] 1 hour, 200° C. | | |
| start b, 10 min., 200° C. | 1.6 | 0.3 |
| overbake b, 1 h, 200° C. | 2.9 | 1.7 |
| delta E | 1.3 | 1.4 |

[1] reverse impact test; ASTM-2794/69. Impact generally is given as inch pound. If at 160 i.p. no cracks are seen in the coating, this is stated as 160 ip. An impact of 160 i.p. equals 1.84 m.kg.
[2] Erichsen Slow Penetration; ISO 1520/DIN 53156.
[3] cross-hatch adhesion; ISO 2409/DIN 5315
[4] DIN 55990; Part B
[5] ADR: acetone double rubs
[6] ASTM D 523/70
[7] in an overbake test the test plate is heated at 200° C. for one hour. Yellowing (b) is measured as well as overall discoloration (delta E)

As seen from this example, the powder paints according to the invention exhibited excellent properties.

Examples III–VII

Powder paints were prepared in a manner analogous to Examples I and II. The compositions of these further powder paints are summarized in Table 2. The characteristics of the cured coatings made from those paints are tabulated in Table 3. The cured coatings were cured by heating the applied powdered coatings at 200° C. for the periods of time presented in Table 3.

TABLE 2

| | Example | | | | |
|---|---|---|---|---|---|
| | III | IV | V | VI | VII |
| Polyester resin 1 | 178.3 | — | — | — | — |
| Polyester resin 2 | — | 178.7 | 178.7 | — | — |
| Polyester resin 3 | — | — | — | 169 | — |
| Polyacrylate 1 | — | — | — | — | 500 |
| Vernonia[1] | 21.7 | — | — | — | — |
| Flexol[R] [2] | — | 21.3 | — | — | — |
| Edenol D82[R] [3] | — | — | 21.3 | — | 100 |
| Crosslinker 1 | — | — | — | 31 | — |
| TiO₂ 2160[R] | 100 | 100 | 100 | 100 | 300 |
| Resiflow PV5[R] | 3 | 3 | 3 | 3 | 9 |
| Benzoin | 1.5 | 1.5 | 1.5 | 1.5 | 2.5 |
| TMG[4] | 1 | 1 | 1 | 1 | 5 |
| Irganox 1010[R] | 1 | 1 | 1 | 1 | 6 |

[1] Vernonia Galamis oil; fully epoxydized, functionality 5–7; e.e.w. = 200; % O = 8.0
[2] epoxydized linseed oil (Flexol[R] plasticizer LOE) from Union Carbide (ELO)
[3] epoxydized soybean oil from Henkel (ESO)
[4] tetramethyl guanidine

TABLE 3

| | Example | | | | |
|---|---|---|---|---|---|
| | III | IV | V | VI | VII |
| cure time | 15' | 10' | 10' | 15' | 15' |
| impact resistance[1] | 160 ip | 160 ip | 160 ip | 160 ip | 160 ip/ cracks |
| ESP[2] | >8 | >8 | >8 | >8 | >8 |
| adhesion[3] | Gto | Gto | Gto | Gto | n.d.[9] |
| gel time, 200° C.[4] | 48 s | 42 s | 49 s | 95 s | 55 s |
| Tg (°C.) | 42 | 43 | 42 | n.d. | n.d |
| acetone resistance[5] | >100 | >100 | >100 | >100 | >100 |
| gloss, 20°[6] | 65 | 46 | 56 | 76 | 82 |
| 60° | 85 | 74 | 80 | 80 | 92 |
| overbake test[7] 1 hour, 200° C. | | | | | |
| start b, 10 min, 200° C. | 2.2 | 1.4 | −.06 | 1.2 | n.d |
| overbake b, 1 h, 200° C. | 3.8 | 2.8 | 2.0 | 1.5 | n.d |
| delta E | 1.6 | 1.4 | 2.8 | 0.5 | n.d |
| flow[8] | rs. | rs. | rs. | v.g. | excellent |

[1] reverse impact test; ASTM-2794/69
[2] Erichsen Slow Penetration; ISO 1520/DIN 53156
[3] cross-hatch adhesion; ISO 2409/DIN 5315
[4] DIN 55990; Part B
[5] ADR: acetone double rubs
[6] ASTM D 523/70
[7] see Table 1
[8] rs. = reasonable; v.g. = very good
[9] n.d. = not determined Preparation of Polyester No. 4

Analogous to the preparation of polyester 1, resin no. 4 was prepared from 1.34 parts by weight of trimethylol propane, 55.82 parts by weight of terephthalic acid, 37.1 parts by weight of neopentyl glycol and 5.0 parts by weight of isophthalic acid. The resin had an acid number of 21.6 mg KOH/g, a carboxyl functionality 3, a viscosity of 4400 dPas and a Tg of 74.5° C.

Example VIII

A powder paint was prepared from resin no. 4 (179.6 parts by weight) and ESO (20.4 parts by weight of epoxydized soybean oil, Edenol D82®, from Henkel) in combination with tolonate HDT®(3.3 parts by weight; the trimer of hexane diisocyanate, a crosslinker containing isocyanate groups; from Rhone Poulenc). The remaining composition ingredients, other than the resin and crosslinker just mentioned above, were as in Example I. The gel time of the powder was 37 seconds.

Curing for 10 minutes at 200° C. and 15 minutes at 180° C. resulted in a coating having the following properties: impact resistance: 160 ip; ESP: >8 mm; acetone double rubs: >300; gloss 20°: 56; gloss 60°: 86. The results show that an isocyanate crosslinker gives improved chemical resistance.

Example IX and comparative Experiment A

Two powder paint compositions were prepared on the basis of Uralac P3500® (DSM Resins BV). The acid number of the resin was 35. The amounts of the ingredients were as in Example II, except that in comparative Experiment A triglycidyl isocyanurate (TGIC) was used instead of epoxydized soybean oil.

The coatings were subsequently subjected to a weather resistance test (QUV, UVB=313; according to ASTM G 53–88).

The time was measured until 50% of the original gloss was measured, the results being presented in Table 4.

TABLE 4

|  | Example IX | Experiment A |
|---|---|---|
| 20° 50% | 400 h | 380 h |
| 60° 50% | 750 h | 520 h |

The powder paint compositions according to the invention produced coatings having improved weather resistance in comparison to a conventional system.

Preparation of polyesters no. 5–9

Using a preparation method analogous to that for polyester resin 1, polyester resins nos. 5 through 9 were prepared with monomers as listed in Table 5 (in parts by weight).

TABLE 5

|  | Polyester Resin | | | | |
|---|---|---|---|---|---|
|  | 5 | 6 | 7 | 8 | 9 |
| trimethylol propane | — | 0.52 | 0.52 | 0.51 | 0.52 |
| terephthalic acid | 52.4 | 50.5 | 55.7 | 60.0 | 44.4 |
| neopentyl glycol | 26.9 | 22.8 | 38.7 | 18.4 | 34.6 |
| cyclohexane dimethanol | 11.5 | 10.2 | — | — | — |
| isophthalic acid[1] | 7.6 | 5.8 | — | 5.7 | 5.8 |
| adipic acid[1] | — | — | 5.1 | — | — |
| ethylene glycol | — | — | — | 7.7 | — |
| propylene glycol | — | — | — | 7.7 | — |
| ester diol[2] | — | 10.2 | — | — | — |
| oxy-bis-benzoic acid | — | — | — | — | 12.6 |
| acid number | 30 | 23 | 24 | 24 | 23 |
| functionality | 2.0 | 2.25 | 2.25 | 2.25 | 2.25 |
| viscosity (dPas) | 950 | 2000 | 780 | 1150 | 2700 |
| Tg (°C.) | 71 | 66 | 58 | 71 | 73 |

[1] added in 2nd step
[2] the ester of neopentyl glycol and hydroxy pivalic acid Examples X–XIV Powder paints were prepared from the polyester resins using a method analogous to that described in Example 1. Further data are given in Table 6.

TABLE 6

|  | Example | | | | |
|---|---|---|---|---|---|
|  | X | XI | XII | XIII | XIV |
| Polyester resin 5 | 183 | — | — | — | — |
| Polyester resin 6 | — | 184 | — | — | — |
| Polyester resin 7 | — | — | 186 | — | — |
| Polyester resin 8 | — | — | — | 183 | — |
| Polyester resin 9 | — | — | — | — | 184 |
| ELO[1] | 17.4 | 16.3 | 14.5 | 17.4 | 16.3 |
| TiO₂ 2160 | 100 | 100 | 100 | 100 | 100 |
| Resiflow PV5R | 3 | 3 | 3 | 6 | 3 |
| benzoin | 1.5 | 1.5 | 1.5 | 1.5 | 1.5 |
| TMG | 1 | 1 | 1 | 1 | 1 |
| Sumilizer GA80R | 0.5 | 0.5 | 0.5 | 0.5 | — |
| Irganox B 168R | — | 1 | 1 | 1 | — |
| Sanduvor 3055R | — | 1 | 1 | — | — |

TABLE 6-continued

|  | Example | | | | |
|---|---|---|---|---|---|
|  | X | XI | XII | XIII | XIV |
| gel time | 53" | 51" | 50" | 60" | 54" |
| Tg (powder) | 46° C. | 42° C. | 41° C. | 50° C. | 50° C. |

[1] Lankroflex R from Harcross Chemicals

The powder paints were electrostatically sprayed onto metal panels and cured. The results are given in Table 7.

TABLE 7

|  | Example | | | | |
|---|---|---|---|---|---|
|  | X | XI | XII | XIII | XIV |
| curing at 200° C. | 8' | 8' | 8' | 8' | 10' |
| impact resistance[1] | 160 ip (1 crk) | n.d. (1 crk) | 160 ip | n.d. (1 crk) | 160 ip |
| gloss, 20° | 75 | 70 | 71 | 69 | 72 |
| 60° | 90 | 86 | 88 | 89 | 90 |
| ESP flow | >8 mm reasonable | n.d. reasonable | >9 mm reasonable | n.d. reasonable | n.d. reasonable |
| appearance | good | minor imperfection | minor imperfection | some craters | good |

[1] For an explanation of the tests, see the notes to Tables 1 and 3.

Preparation of polyester resins no. 10–14

In a manner analogous to the preparation of polyester resin 1, resins nos. 10 through 14 were prepared using monomers as listed in Table 8.

TABLE 8

|  | Polyester Resin | | | | |
|---|---|---|---|---|---|
|  | 10 | 11 | 12 | 13 | 14 |
| trimethylol propane | — | 1.4 | 1.5 | 1.4 | 0.61 |
| terephthalic acid | 52.4 | 55.2 | 56.9 | 51.3 | 56.8 |
| isophthalic acid[1] | — | — | — | 6.3 | 3.8 |
| 1,4-cyclohexane dicarboxylic acid[1] | 7.3 | 6.5 | — | — | — |
| 1,4-cyclohexane dimethanol | 11.5 | — | — | — | — |
| neopentyl glycol | 28.8 | 36.9 | 37.9 | 35.3 | 38.8 |
| caprolactone | — | — | — | 5.7 | — |
| succinic anhydride[1] | — | — | 3.5 | — | — |
| acid number | 30 | 27 | 30 | 27 | 15 |
| functionality | 2.0 | 2.75 | 2.75 | 2.25 | 2.5 |
| viscosity (dpas) | 1050 | 2400 | 2400 | 1400 | 3300 |
| Tg (°C.) | 67 | 69 | 63 | 57 | 51 |

[1] added in last step

Examples XV–XIX

Powder paints were prepared from the polyester resins using a method analogous to that described in Example 1. Further data are given in Table 9.

TABLE 9

| | Example | | | | |
|---|---|---|---|---|---|
| | XV | XVI | XVII | XVIII | XIX |
| Polyester resin 10 | 182 | — | — | — | — |
| Polyester resin 11 | — | 181 | — | — | — |
| Polyester resin 12 | — | — | 182 | — | — |
| Polyester resin 13 | — | — | — | 181 | — |
| Polyester resin 14 | — | — | — | — | 186 |
| ELO[1] | 17.8 | 19 | 18.4 | 19 | — |
| ELO[2] | — | — | — | — | 14 |
| TiO$_2$ 2160 | 100 | 100 | 100 | 100 | 100 |
| Resiflow PV5$^R$ | 3.0 | 3.0 | 3.0 | 3.0 | 3.0 |
| benzoin | 1.5 | 1.5 | 1.5 | 1.5 | 1.5 |
| TMG | 1.0 | — | 1.0 | 1.0 | 1.0 |
| Sumilizer GA80$^R$ | 1.0 | — | — | 0.5 | — |
| Irganox B168$^R$ | 1.0 | — | — | 1.0 | — |
| Irganox 1010$^R$ | — | — | 1.0 | — | 1.0 |
| Irganox 245$^R$ | — | 1.0 | — | — | — |
| CETAB[3] | — | 1.0 | — | — | — |
| gel time | 62" | 97" | 80" | 35" | 206" |
| Tg (powder) | n.d. | n.d. | 35° C. | 35° C. | 45° C. |

[1]Lankroflex$^R$ from Harcross Chemicals
[2]Edenol D82$^R$ from Henkel
[3]CETAB = cetyl triethyl ammonium bromide The powder paints were electrostatically sprayed onto degreased steel panels and cured. The results are given in Table 10.

TABLE 10

| | Example | | | | |
|---|---|---|---|---|---|
| | XV | XVI | XVII | XVIII | XIX |
| curing at 200° C. | 8' | 10' | 10' | 8' | 10' |
| impact[1] resistance | 160 ip[2] | 160 ip | 160 ip | 160 ip | 160 ip |
| gloss, 20° | 71 | 76 | 60 | 66 | 74 |
| 60° | 86 | 84 | 80 | 90 | 84 |
| ESP | >9 mm | >9 mm | n.d. | >9 mm | n.d. |
| flow | reasonable | reasonable | reasonable | reasonable | reasonable |
| appearance | reasonable | good | good | minor imperfection | reasonable |
| salt spray[3] | 11 mm | 8 mm | detachment | n.d. | n.d. |

[1]For an explanation of the tests, see Tables 1 and 3
[2]impact resistance also achieved at 10'/160° C.
[3]salt spray test, ASTM B117-6

Polyester resin 15 and Example XX

In a manner analogous to the preceding examples, resin no. 15 was prepared from trimethylol propane (0.51 wt. %), terephthalic acid (62 wt. %), ethylene glycol (14.9 wt. %), neopentyl glycol (16.8 wt. %) and isophthalic acid (5.7 wt. %). The polyester resin no. 15 had an acid number of 23, a viscosity of 1350 dPas (Emila, 158° C.), a Tg of 71° C. and a theoretical —COOH functionality of 2.25.

The resin was mixed with a 20% excess (relative to the stoichiometric amount) of epoxydized linseed oil (Lankroflex®, Harcross Chemicals, with an epoxy equivalent weight of 180) and with further customary additives in a kneader at 120° C., cooled and ground. The gel time of the resulting powder was 56 sec., and its Tg was 48° C. The powder exhibited very good storage stability (7 days, 40° C.).

Impact resistance (160 ip) was obtained by curing for 10 minutes at 180° C.

Polyester resin 16 and Example XXI

Resin no. 16 was prepared from terephthalic acid (43.7 parts), adipic acid (41.5 parts) and 1,4-cyclohexane dimethanol (81.4 parts). The resulting crystalline resin no. 16 had a melting point of 200° C., an acid number of 20, and a theoretical —COOH functionality of 2.

This polyester resin (10 parts) was processed, together with 18 parts of epoxydized linseed oil ("ELO"; Lankroflex®, Harcross Chemicals), 172 parts of polyester resin (acid number 25; viscosity 1900 dPas; Tg 75° C., obtained from 0.5 mol % TMP, 21.9 mol.% terephthalic acid, 22.4 mol % neopentyl glycol and 2.5 mol % isophthalic acid) and with the usual other components as specified in Example 1 into a powder paint. The gel time was 44 seconds and the Tg of the powder paint was 36° C.

The cured coating (10', 200° C.) had an impact resistance of >160 ip, a gloss at 20° of 65 and at 60° of 85. Its flow was moderate, and the appearance of the coating was good.

Preparation of a polyesteramide resin and Example XXII

A polyester-amide resin was prepared from trimethylol propane (1.3 wt. %), terephthalic acid (58.7 wt. %), neopentyl glycol (26.6 wt. %), hexamethylene diamine (7.3 wt. %) and isophthalic acid (5.8 wt. %). The resin had an acid number of 23, a Tg of 69° C. and an acid functionality of 2.75.

The resin (183 parts) was processed with 17.2 parts of ELO (Lankroflex®, Harcross, epoxy equivalent weight of 180) and the customary additives as specified in Example 1 to obtain a powder paint. The gel time was 82 seconds and the Tg of the powder paint 44° C.

The cured coating had a good chemical resistance (>100 acetone rubs). The flow was good, as was the gloss (20°, 78; 60°, 88). The Erichsen slow penetration was good, >8 mm.

Preparation of crosslinkers 2 and 3

A crosslinker no. 2 was obtained as follows. Epoxydized soybean oil (50 wt. %) was mixed at 150° C. with a 50 wt. % linear acid polyester of terephthalic acid (17.5 mol %), neopentyl glycol (18.5 mol %) and isophthalic acid (2.0 mol %). The polyester had an acid number of 25 and a Tg of 68° C. 0.5 wt. % TMG was added and the mixture was kept at 150° C. for 3½ hours. The resulting product had an epoxy equivalent weight of 600 a % O of 2.7, a Tg of 0° C. and an acid number below 1.

A crosslinker no. 3 was obtained by heating epoxydized linseed oil (500 g) with isophthalic acid (42 g), para-tertiary butyl benzoic acid (60 g) and TMG (1 g). The mixture was heated to 180° C. and then cooled to 150° C. in 1½ hours. The resulting product (acid number <2; epoxy equivalent weight 360; % O=4.4 Tg −10° C.) was cooled and crushed.

Polyester 18 and Examples XXIII–XXVI

A polyester resin no. 18 was prepared with 1.04 parts by weight of trimethylol propane, 44.7 parts by weight of terephthalic acid, 34.4 parts by weight of neopentyl glycol, 2.8 parts by weight of cyclohexane dimethanol and 17.19 parts by weight of isophthalic acid. The resulting resin had an acid number of 27, a viscosity of 1400 dPas, a Tg of 68° C. and a functionality of 2.4.

Powder paints were prepared from several crosslinkers and polyester resin no. 18 in the manner described above. The data are presented in Table 11.

TABLE 11

|  | Example | | | |
| --- | --- | --- | --- | --- |
|  | XXIII | XXIV | XXV | XXVI |
| Polyester resin 18 | 181 | 147 | 165 | 181 |
| ELO[1] | 19 | — | — | 18 |
| Crosslinker 2 | — | 53 | — | — |
| Crosslinker 3 | — | — | 35 | — |
| TiO$_2$ 2160 | 100 | 100 | 100 | 100 |
| Resiflow PV5$^R$ | 3 | 3 | 3 | 3 |
| benzoin | 1.5 | 1.5 | 1.5 | 1.5 |
| TMG | 1.0 | 1.0 | 1.0 | — |
| Irganox 1010$^R$ | 1.0 | 1.0 | 1.0 | — |
| IPDI-diTMG[2] | — | — | — | 1.7 |
| gel time | 45" | 55" | 36" | 58" |
| Tg (°C.) | n.d. | 33 | 45 | 36 |

[1]Lankroflex$^R$ from Harcross Chemicals
[2]isocyanate-blocked tetramethyl guanidine catalyst.

The powder paints were electrostatically sprayed onto metal panels and cured at 200° C. The results are presented in Table 12. The tests reported in Table 12 are as explained with respect to Tables 1, 3 and 10.

TABLE 12

|  | Example | | | |
| --- | --- | --- | --- | --- |
|  | XXIII | XXIV | XXV | XXVI |
| curing | 10' | 20' | 10' | 15' |
| impact resistance | 160 ip | 160 ip | small cracks at 160 ip | 160 ip |
| gloss, 20° | 60 | 65 | 44 | 72 |
| 60° | 84 | 83 | 81 | 85 |
| flow | good | reasonable/good | moderate | good |
| appearance | good | minor imperfection | good | good |
| salt spray | 5 mm | 6 mm | n.d. | 8 mm |

Polyester resin 19 and Example XXVII

A polyester resin no. 19 was prepared from 50.8 parts by weight of terephthalic acid, 38.9 parts by weight of neopentyl glycol, 4.45 parts by weight of adipic acid and 5.85 parts by weight of trimellitic anhydride. The resulting polyester had an acid number of 41, a —COOH functionality (theoretical) of 4, a viscosity of 540 dPas and a Tg of 58° C.

The polyester (447 parts by weight) was mixed in a kneader with ESO (Henkel Edenol D82®) (103 parts by weight), 300 parts by weight of titanium dioxide and the further customary additives as in Example 1. The gel time was 45" and the Tg 20° C. The powder paint was stored at 5° C.

The powder paint was separately electrostatically applied to three earthed metal substrates. The three plates with powder were respectively heated to cure the coating. One was heated to 200° C. for 8 minutes, one to 180° C. for 10 minutes, and one to 170° C. for 12 minutes. In each instance the powder coating showed good properties. The impact resistance was found to be >160 ip. The gloss was 78% at 20° and 90% at 60°. The flow and the appearance were good in all cases.

Polyester resin 20 and Example XXVIII

A polyester resin no. 20 was prepared by esterification, in a first step, of terephthalic acid (1441 grams) and neopentyl glycol (972 grams) to obtain a product having an OH number of 14. Trimellitic anhydride (96 grams) and octanol (36.0 grams) were then added to this product (1532 grams), and esterification was conducted at ~210° C. The resulting polyester had an acid number of 27, a —COOH functionality of 3.5, a Tg of 63, and a viscosity of 1300 dPas.

The powder paint prepared with 176 parts by weight of this polyester, 24 parts by weight of ESO (Henkel, Edenol D82®) and customary additives (see Example 1) had a gel time of 35 seconds.

A coating on a substrate was obtained after curing the powder paint for 10 minutes at 200° C. That coating had a good acetone resistance (>100 adr) as well as a good appearance.

Preparation of a mixture of crosslinkers and Example XXIX

A bisphenol-A epoxy resin (Epikote 1007®, with an epoxy equivalent weight of 2000, a Tg of 69° C. and a functionality of 2) was mixed in a kneader with 7 wt. % epoxydized linseed oil (Lankroflex®, Harcross Chemicals). The resulting mixture had a Tg of 55° C. and an epoxy equivalent weight of 1160, and a % O of 1.38.

265 parts by weight of the above mixture (18.5 parts of ELO and 246.5 parts of epoxy resin) were added to 335 parts by weight of polyester (Uralac P5072® from which the catalyst had been removed, with an acid number of 38 and a functionality of ~2.3). This binder was mixed in a kneader at 120° C. with 300 parts by weight of TiO$_2$, 9 parts of Resiflow PV5®, 2.5 parts of benzoin, 1.8 parts of TMG and 3.0 parts of Irganox 245®, cooled, ground and screened to obtain a powder paint (average size of about 50 microns). The results are presented in Table 13.

Comparative experiment B

In a manner analogous to Example XXIX, a powder paint was prepared, except that 255 parts by weight of resin P5072 and 345 parts by weight of Epikote 1007®, but no ELO were used. The powder paint was applied to a substrate and the results are presented in Table 13.

TABLE 13

|  | Example XXIX | Experiment B |
| --- | --- | --- |
| gel time | 180' | 230" |
| cure 200° | 10' | 10' |
| gloss, 20° | 83 | 70 |
| 60° | 96 | 93 |
| flow | reasonable | moderate |
| appearance | good | imperfections |
| acetone | 130 ADR | 40 ADR |
| ESP (mm) | 8 | 8 |
| cure 230° | 10' | 10' |
| impact | 160 ip | 160 ip |

The results given in Table 13 prove that the use of epoxidized linseed oil in a hybrid binder system yields improved acetone resistance, gloss and flow.

Preparation of a binder composition and a powder paint Example XXX

A binder composition was prepared as follows: A Resin (no. 10) was prepared again, and was mixed in a flask at 150° C. with 12.5 wt. % epoxydized linseed oil (35% excess) for 10–20 seconds. The binder was poured out, crushed and ground.

A powder coating was prepared with the binder by mixing 600 parts by weight of the binder with titanium dioxide (300 parts by weight), Resiflow PV5®(9 parts), benzoin (4.5 parts), Irganox 245®(3 parts) and TMG (3 parts). The mixture was extruded twice in a laboratory extruder (Buss Ko-Kneter, PLK 46B®) at 120° C., cooled, ground and sieved to produce a powder paint (average particle size of about 50 microns). The powder paint had a gel time of 65 seconds.

Two coatings were prepared, one by curing the resin in 6 minutes at 200° C., and the other by curing the resin in 10 minutes at 165° C. The thus cured coatings passed the impact test (160 ip ). The gloss at 20° was 57, and at 60° was 81.

Example XXXI

In an extruder (Buss PLK 46B®) 530 parts by weight of polyester resin with hydroxyl groups (OH number: 40, acid number <3, functionality=3.25), which is commercially available (Uralac P4215®), were mixed at 120° C. with 23 parts by weight of succinic anhydride, 48 parts by weight of epoxydized linseed oil (Lankroflex®, Harcross Chemicals), 3 parts by weight of dimethyl amino pyridine, 6 parts by weight of flow-promoting agent (BYK 360®), 4.5 parts by weight of benzoin and 3 parts by weight of Irganox 245®, after which the mixture was cooled, crushed and ground to a powder. The powder had a Tg of 25° C., and it was stored under cooled conditions.

The powder was cured in 10 minutes at 200° C. and the coating exhibited good flow. The acetone resistance was excellent (150 ADR).

Example XXXII

A 90/10 wt. % mixture of a bisphenol-A epoxy (Epikote 1007®) and epoxydized linseed oil (Lankroflex®, Harcross Chemicals) was prepared in a kneader. To this mixture (760 parts by weight), Casamid 710®(40 parts by weight, a curing agent with phenolic groups for resins that contain epoxy groups), Resiflow PV5® (12 parts by weight), benzoin (6 parts by weight) and Irganox 1010® (4 parts by weight) were added, and the mixture was homogenized in a Buss PLK 46B extruder at a speed of 200 rpm and a temperature of 100°–120° C. The extruded product was cooled, crushed, and ground to a powder (average particles size of 50 microns, all particles passing 110 micro-sieve). The resulting powder paint had a gel time of 200 seconds and could be cured in 15 minutes at 200° C. The coating obtained from that powder paint had very good gloss (20°: 91, and 60°: 97), good flow, good appearance, an acetone resistance of 100 ADR and an impact resistance of 160 ip. Unexpectedly, and contrary to customary 100% epoxy resin systems, the powder paint did not show any tendency to form craters.

Polyester no. 21 and Example XXXIII

In the manner as described for the preparation of polyester resin no. 1, a polyester (No. 21) was prepared in a two-step process. First, trimethylolpropane (1.36 pbw), terephthalic acid (54 pbw) and neopentylglycol (37.5 pbw) were combined and allowed to react to form a substantially hydroxyl functional polyester. In the second step, isophthalic acid (6.1 pbw) was allowed to react with the product from step 1.

Thereafter phosphoric acid (0.76 pbw) was added and allowed to react. The resulting carboxylic acid and phosphoric acid functional polyester had an acid number of 35, an acid functionality of 2.75 and a Tg of 74° C.

A powder paint was prepared from this polyester (173 grams), epoxydized soybean oil (31.0 grams; Edenol D82® from Henkel) and the customary additives as in Example 1. The gel time was 58 seconds, and the Tg of the powder paint was 30° C. The coating which was obtained on a substrate after curing the applied powder for 10 minutes at 200° C. had a good acetone resistance (>100 ADR), and an excellent salt spray resistance (only 6 mm after 500 hr according ASTM B 117-61). The coating passed the 160 ip impact test, exhibited good flow and appearance, and had a gloss of 66 at 20° and 89 at 60°. The coating showed very good resistance against overbake (Start B, 10' at 200° C.: 0.1; overbake after 1 hr at 200° C.: 0.8; Delta E: 0.9).

Preparation of a binder composition and a powder paint Example XXXIV

A binder composition was made as follows. Polyester no. 10 was prepared again, which resulted in a polyester resin with an acid number of 26 and a viscosity of 220 dPas (Emila) at 180° C. The resin was supplied to a static mixer at a temperature of about 175° C., in which it was mixed with 8.9 wt. % of epoxydized linseed oil that had been heated to 100° C. The residence time of the mixture in the static mixture was about 13 seconds. The static mixer was a Sulzer SMX with a diameter of 27.3 mm and a length of 40 cm. The throughput was 60 liters/h with a pressure drop across the mixer of 1 bar. The mixing time, from the moment of feeding in of the crosslinking agent to cooling on the cooling belt, was 20–60 seconds, depending on the shape of the resin feeder. The time needed for cooling to 40° C. was 1½ minutes. The cooling belt used was cooled with water. The cooling belt ran at a speed of 1.3 m/min. and the length of the belt was 1.85 m. At the end of the cooling belt the glassy material was crushed to particles having a size of 5–30 mm. Analysis of the quantity of epoxy and acid groups showed that the composition was very homogeneous and that less than 7% of the epoxy groups had reacted.

Starting from the binder composition as described above, a powder coating was made by mixing 600 parts by wt. of binder composition, 300 parts by wt. of TiO$_2$, 9 parts by wt. of Resiflow PV5®, 4.5 parts by wt. of benzoin, 3.0 parts by wt. of tetramethyl guanidine and 3.0 parts by wt. of Irganox 245® (stabilizer) at 120° C. in a Buss continuous kneader. The homogeneous mixture was cooled, crushed and ground, and a powder with particles of 50–90 µm was screened out. This powder coating had a gel time of 59 seconds and a glass transition temperature of 42° C. After hardening for 6 minutes at 200° C. on a steel plate the coating had the following properties: the impact strength (reversed impact) was 160 in.lb. The gloss of the cured paint coat was 54% at 20° and 78% at 60° and the appearance was good.

Example XXXV

With the binder composition described for Example XXXIV, a powder paint was prepared in which TGIC was used as an extra crosslinker.

594 grams of the binder composition as described in Example XXXIV was dry mixed with 6 grams of triglycidylisocyanurate (TGIC), 300 grams titaniumdioxide, 9 grams Resiflow PV5®, 4.5 grams benzoin, 3.0 grams TMG and 3.0 grams Sumilizer GA80®. Thereafter, the mixture was fed into an extruder with a temperature of 120° C. and rotating with 100 rpm. The obtained homogeneous mixture was directly cooled and ground. The powder paint had a geltime of 52 sec and a Tg of 44° C. Apparently the TGIC reacted in the extruder because the Tg increased from 42° C. (see Example XXXIV) to 44° C. In case the TGIC would not have reacted, a decrease in Tg was expected from at least 1.5° C.

The powder paint was used to obtain a coating. The paint was sprayed onto a metal plate and it was cured for 6 min at 200° C. The impact was 160 ip, the gloss was 68% at 20° and 87% at 60°, the flow and appearance were good.

Polyester resin 22 and Example XXXVI

In the manner as described for the preparation of polyester resin no. 1, a polyester (no. 22) was prepared from 0.56 wt. % trimethylolpropane, 26.3 wt. % 1,3-propyleneglycol, 55.2 wt. % terephthalic acid, 11.3 wt. % dianol 22® (ethoxylated bisphenol-A) and 6.2 wt. % isophthalic acid. The resulting resin had an acid number of 27, an acid functionality of 2.25, a viscosity of 1400 dPas and a Tg of 82° C.

A powder paint was prepared from this polyester (183.5 g), epoxydized linseed oil (16.5 g), TiO$_2$ (100 g), TMG (1 g), Irganox 245® (1 g), Resiflow PV5® (3 g) and benzoin (1.5 g) in an extruder.

The gel time of the powder was 70 sec and the storage stability (physical stability) of the powder was excellent (7 days at 40° C.). The coating could be cured in 8 min at 200° C. to obtain a coating with good mechanical properties (160 ip, only a few cracks) and good overbake resistance (start b: 1.8, b after 1 hr 200° C.: 3.6, ΔE: 1.9).

Polyester resin 23 and Examples XXXVII–XXXX

In the manner as described for the preparation of polyester resin no. 1, a polyester (no. 23) was prepared from 0.59 wt. % trimethylolpropane, 54.7 wt. % terephthalic acid, 35.7 wt. % neopentylglycol and 6.5 wt. % isophthalic acid. The acid number of the polyester was 25, the —COOH functionality was 2.25, the viscosity was 1000 dPas and the Tg was 68° C.

Several powder paints were prepared with this resin with several catalysts.

The crosslinker (epoxydized linseed oil) was mixed with a sterically hindered phenol-type stabilizer in a 16:1 wt. ratio. A binder composition was prepared by mixing and extruding 143 grams of polyester resin, 17 grams of the ELO/stabilizer mixture, 100 grams TiO$_2$, 3 grams Resiflow PV5® and 1.5 grams benzoin.

Masterbatches were prepared by mixing 6 grams of a certain catalyst (as shown in Table 14) with 120 grams of an acid functional polyester resin Uralac P3401® from DSM Resins.

Powder paints were prepared as shown in Table 14 (amounts in grams).

TABLE 14

| | Example | | | |
|---|---|---|---|---|
| | XXXVII | XXXVIII | XXXIX | XXXX |
| Pigmented binder composition[1] | 264 | 264 | 264 | 264 |
| Masterbatch Catalyst | 40 TMG | 40 benz- | 40 1-benzyl | 40 4,5- |

TABLE 14-continued

| | Example | | | |
|---|---|---|---|---|
| | XXXVII | XXXVIII | XXXIX | XXXX |
| | | imidazol | imidazol | diphenyl imidazol |
| gel time | 78 s | 111 s | 83 s | 236 s |

[1]includes pigment and additives

The powder paints were sprayed on metal substrates and cured at 200° C. Results are shown in Table 15.

TABLE 15

| | Example | | | |
|---|---|---|---|---|
| | XXXVII | XXXVIII | XXXIX | XXXX |
| curing at 200° C. | 10' | 20' | 10' | 20' |
| impact[1] resistance | 10 ip[2] | 10 ip[3] | 120 ip | 10 ip |
| gloss | | | | |
| 20° | 72 | 80 | 80 | 84 |
| 60° | 84 | 88 | 83 | 89 |
| ESP | >8 | >8 | >8 | >8 |
| flow | good | very good | good | very good |
| appearance | good | good | good | good |
| overbake test 1 hr 200° C. | | | | |
| start b | 1.9 | 1.3 | 1.0 | 0.6 |
| 10 min 200° overbake b 1 hr 200° C. | 2.8 | 4.4 | 3.9 | 3.5 |

[1]For an explanation of the tests, see tables 1 and 3; impact is measured after 3 days
[2]at 230° C., 10 min cure an impact was achieved of 120 ip on an aluminum alloy substrate
[3]on an aluminum alloy substrate, the impact was 160 ip after 10' 200° C. cure.

Polyester Resin 24 and Example XXXXI

A crystalline polyester (no. 24) was prepared by esterification of 0.35 wt. % trimethylolpropane, 59.6 wt. % terephthalic acid and 39.9 wt. % 1,6-hexanediol with 0.04 wt. % dibutyltin oxide and 0.09 wt. % tris-nonyl phenyl phosphite at 240°–245° C. The characteristics of the polyester obtained in this one-step synthesis were an acid number of 33 mg KOH/g, a functionality of 2.1, a viscosity of 160 dPas (Emila 158° C.), and a melting point of 144° C.

A powder paint was prepared by premixing this polyester (348 g), epoxidized soybean oil (wpe: 240, 52 g), Kronas 2310 (white pigment, titanium dioxide) and flow promoting agent (3 g). The premix (500 g) so obtained was mixed with TMG (1.64 g) and stabilizer (4 g) by extrusion at 145° C. (twice), cooled and ground. Particles smaller than 100 µm were sieved to obtain a powder paint with a gel time of 177 s and an excellent storage stability (no caking after 7 days at 40° C.). The powder paint electrostatically sprayed on a steel substrate and then cured in 10 min at 200° C. to obtain a coating. The coating passed the impact test (160 i.p.); had good flow, and had a gloss of 23% at 20° and 54% at 60°.

What is claimed is:

1. A process for preparing a wholly or partially coated substrate by applying a powder plant consisting essentially of
   (i) a polyester polymer having carboxyl functional groups capable of reacting with epoxy groups wherein said polymer has an acid number higher than 10 and less than 50, (ii) a crosslinker containing epoxy groups and having an epoxy functionality greater than 1, wherein said crosslinker (ii) contains at least one epoxidized oil having at least one epoxy-functional $C_5$–$C_{26}$ linear or branched aliphatic chain, and (iii) at least one member selected from the group consisting of a catalyst, curing agent other than the epoxidized oil, pigment, fillers, and additives other than the pigment or fillers on a substrate to obtain a coating; and curing the coating by exposure to heat at an elevated temperature to obtain a cured coating;

wherein (a) the polymer capable of reacting with epoxy groups (i), the crosslinker (ii), optionally an amount of catalyst and optionally an amount of curing agent are selected so that the curing reaction is substantially complete within 30 minutes at 200° C., and (b) the amount of said epoxidized oil is such that more than 35% of the crosslinking is obtained through said epoxidized oil.

2. Process according to claim 1, wherein the amount of said epoxidized oil is such that more than 50% of the crosslinking is obtained through said epoxidized oil.

3. A process according to claim 1, wherein the amount of oxirane oxygen originating from said epoxidized oil is greater than 0.1 meq/gram of crosslinker (ii) and polymer (i).

4. A process according to claim 1, wherein the powder paint contains between 3 and 20 wt. % aliphatic chains carrying an epoxy group.

5. A process according to claim 1, wherein said epoxidized oil contains internal epoxy groups according to formula (I)

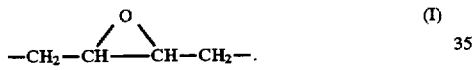

(I)

6. A process according to claim 1, wherein the epoxidized oil contains aliphatic esters having an epoxy group carried on the aliphatic chain.

7. A process according to claim 1, wherein the Tg of the polymer (i) is greater than 30° C.

8. A process according to claim 1, wherein the viscosity of the polymer (i) is less than 8000 dPas, measured at 158° C. according to Emila.

9. A process according to claim 1, wherein the polymer (i) has a Tg of about 60° C. to about 90° C.

10. A process according to claim 1, wherein the powder paint contains a catalyst.

11. A process according to claim 10, wherein said catalyst is a lithium alkanolate.

12. A process according to claim 1, wherein said polymer (i) and said crosslinker (ii) constitute a binder, said binder having a Tg greater than about 30° C., and said polymer having a viscosity of less than 8000 dPas (measured at 158° C. according to Emila).

13. A process according to claim 1, wherein in said at least one epoxidized oil the epoxy functionality is not composed of terminal epoxy groups, said crosslinker has an epoxy functionality greater than 2.1.

14. A process for preparing a wholly or partially coated substrate by applying a powder paint comprised of (i) a polyester polymer having carboxyl functional groups capable of reacting with epoxy groups and wherein said polymer (i) has an acid number higher than 10 and less than 50, (ii) a crosslinker which consists essentially of at least one epoxidized oil which has an epoxy functionality greater than 1 and contains at least one epoxy-functional $C_5$–$C_{26}$ linear or branched aliphatic chain, wherein said crosslinker is essentially the sole crosslinker, and (iii) at least one member selected from the group consisting of a catalyst, curing agent other than the epoxidized oil, pigment, fillers, and additives other than the pigment or fillers on a substrate to obtain a coating; and curing the coating by exposure to heat at an elevated temperature to obtain a cured coating wherein (a) the polymer capable of reacting with epoxy groups (i), the crosslinker (ii), optionally an amount of catalyst and optionally an amount of curing agent are selected so that the curing reaction is substantially complete within 30 minutes at 200° C.

15. A process according to claim 1, wherein said epoxidized oil the at least one epoxy-functional chain is a $C_5$–$C_{22}$ linear or branched aliphatic chain.

16. A process according to claim 1, wherein the polymer (i) has a acid number less than 35.

* * * * *